United States Patent Office 2,943,737
Patented July 5, 1960

2,943,737
FILTER AND METHOD FOR PURIFYING OIL

James A. Norton, Flint, Mich., assignor to General Motors Corporation, Detroit, Mich., a corporation of Delaware No Drawing. Filed July 24, 1957, Ser. No. 673,769

15 Claims. (Cl. 210—75)

This invention is a continuation-in-part of United States application for Letters Patent Serial No. 330,926, filed January 12, 1953, now abandoned, and relates to improvements in the purification of oils and more particularly to the filtration of lubricating oils.

Oils employed in the lubrication of internal combustion engines become contaminated with particles of metal, dirt, lead salts, carbon and other foreign materials. These materials, often microscopic in size, if allowed to remain in the lubricating oil, will discolor the oil and cause damage to the engine either through their abrasiveness or chemical action. It is well known in the art to filter lubricating oils in an attempt to remove such contaminant particles. However, such oil filters, built into the engine itself or connected in the lubricating oil circulatory system in some manner, must be rather porous in order to permit the ready passage of oil through the filter at a relatively low pressure drop to avoid overloading the engine oil pump. As a result, only the larger contaminant particles are removed by the filter and the smaller particles may pass through the filter repeatedly.

This invention has for its principal object the improved filtration of lubricating oils. More specifically, it has for its object the provision of an mproved oil filter element and method for purfying lubricating oils. Other objects and advantages will more fully appear in the description which follows.

I have discovered that greatly improved filtration of lubricating oil is obtained when certain filtration assistants are used. According to the present invention, the filtration assistants employed are the polyglycols polyethylene glycol, polypropylene glycol, polyethylene-polypropylene glycol and mixtures thereof, preferably having a molecular weight within the range of approximately 180 to 4000. Thus, my invention comprehends an oil filter element having deposited thereon one or more of these enumerated polyglycols. Such a filter aids not only in cleansing and purifying the oil but also in increasing the workable life of the lubricating oil.

The preferred filtration assistant is polypropylene glycol such as can be made, for example, through interaction of a relatively large amount of propylene oxide with a relatively small amount of water or propylene glycol in the presence of a suitable catalyst. Polypropylene glycols having an average molecular weight within the range of about 180 to 2800 are preferred, optimum results being obtained with polypropylene glycol having a molecular weight of approximately 350 to 750. A suitable polypropylene glycol is available commercially as the Dow Chemical Co. "Polyglycol P–400."

At times, it is desirable to replace the polypropylene glycol, either wholly or in part, by a polyethylene glycol such as can be made, for example, by the interaction of a relatively large amount of ethylene oxide with a relatively small amount of water or ethylene glycol, generally in the presence of a mineral acid catalyst. It is desirable to employ a polyethylene glycol having an average molecular weight within the range of approximately 300 to 4000; 1000 to 4000 being the preferred range.

The invention also comprehends copolymers of propylene glycol and ethylene glycol, i.e., polyethylene-polypropylene glycols prepared, for example, by reacting mixtures of ethylene oxide and propylene oxide with a relatively small amount of water, ethylene glycol or propylene glycol. Superior results are obtained when the copolymer used as the filtration assistant has a high ratio of propylene oxide units to ethylene oxide units, as is obtained, for example, by employing a high ratio of propylene oxide to ethylene oxide in its preparation.

Physical mixtures of polyethylene glycols and polypropylene glycols in varying proportions may also be employed; a particular illustrative example is a mixture of 90% by weight of a polypropylene glycol, having a molecular weight within the range of about 400 to 750, and 10% by weight of a polyethylene glycol having a molecular weight within the range of about 1000 to 2500.

The amount of the polyglycol employed will depend, of course, on the type and size of filter medium as well as the intended application. In general excellent results may be obtained using a coating of the polyglycol on the filter medium in an amount equal to about 5% to 30% by weight of the untreated filter medium. In filters for conventional automobile engines, a coating of polypropylene glycol in an amount equal to about 7% to 15% by weight of the untreated filter medium or a coating of polyethylene glycol in an amount equal to about 5% to 12% by weight of the untreated filter medium provides excellent results.

For example, superior oil filtration is obtained in a passenger car engine application with a suitable filter element made, for example, of paper having a filtering area of approximately 450 to 750 square inches, and coated with about 4 to 20 grams, 12 grams being preferred, of polypropylene glycol. In another application, employing a larger filter element, for example, a filter element suitable for use in trucks or diesel engine applications and having a filter area of approximately 970 square inches, excellent results are obtained using about 10 to 40 grams, 20 grams being preferred, of the polyglycol.

The oil filter medium used can be of any suitable oil-penetrable filter material such as a paper filter medium, as used in conventional oil filters, a cloth filter element, a cotton waste filter element, mineral wool or any other oil-penetrable filter material whether in the form of a shaped filter element, sheets, rolls or fibrous material for inclusion in a suitable container having an inlet for the contaminated oil and an exit for the filtered oil which has passed through the filter medium. The preferred filter medium is porous paper impregnated with an oil-insoluble cured thermosetting resin such as phenol formaldehyde, melamine formaldehyde or the like, preferably the former. Such a resin can be applied to a filter medium and subsequently, converted to a cured and insoluble state, as by heating, without rendering the filter medium impervious to the oil to be filtered or otherwise damaging the filter element. Such resin impregnated paper provides a porous filter medium which is very strong, and resistant to water and crankcase acids.

An advantageous method for depositing the polyglycol on the preformed filter medium comprises the steps of injecting the desired amount of polyglycol (melting it first if it is a solid at room temperature) into the interior of the shaped filter element. To distribute the polyglycol, the element can be, if desired, rotated so that the centrifugal force provides a coating on the inner surface of the filter element. Another method for applying the filtration assistant is to dissolve the polyglycol in a suitable solvent such as oleum spirits, into which the filter medium is immersed, withdrawn and then allowed to drain. To remove the last of the solvent, the element can be heated, as in an oven, for about one hour at 250° F.

The following is a specific and illustrative example of a method of forming an improved oil filter element embodying the present invention. An oil-penetrable filter paper is first impregnated with uncured phenolformaldehyde resin. The resin-impregnated filter paper, after being heated if necessary to drive off any solvent present in the resin, is formed into the desired shape to form it into a filter element. The phenol-formaldehyde resin is then cured in situ by heating the shaped, impregnated filter element until the resin is converted into an insoluble state after which the desired amount of polyglycol is injected into the element while it is rotated at about 800 r.p.m.

Modern lubricating oils for internal combustion engines are generally formulated to include one or more detergent additives, such lubricating oils being commonly referred to as high detergency oils. One of the prime difficulties with previously proposed types of filtration assistants has been their marked tendency to remove or destroy the effect of the detergent additives. One of the features of the filtration assistants of the present invention is that they not only effect a great improvement in removing harmful particles from the oil but they are also substantially free of detrimental effect on the oil additives. In fact, the polyglycols of the present invention, particularly polypropylene glycol, actually have been found to demonstrate a detergency-boosting effect on high detergency type lubricating oils. Thus, particularly for use in automotive vehicle type engine lubricating systems, the filtration assistant can advantageously consist substantially entirely of one or more of the polyglycols, namely polyethylene glycol, polypropylene glycol, polyethylene-polypropylene glycol. However, other materials, as for example may be diluents or may display their own filtration assisting or other properties, may if desired be admixed with these polyglycols or any of them, and such mixture employed as the filtration assistant, all fully within the spirit and intended scope of the present invention as defined by the claims which follow.

I claim:

1. An oil filter of the type used in an engine for filtration of the engine lubricating oil comprising an oil penetrable filter medium in a container having an inlet for the admission of contaminated oil and an exit for the filtered oil, said filter medium having deposited thereon as a filtration assistant an effective amount of a polyglycol selected from the group consisting of polyethylene glycol, polypropylene glycol, polyethylene-polypropylene glycol and mixture thereof.

2. An oil filter as defined in claim 1 wherein said polyglycol has an average molecular weight of from about 180 to about 4000.

3. An oil filter of the type used in an engine for filtration of the engine lubricating oil comprising an oil penetrable filter medium in a container having an inlet for the admission of contaminated oil and an exit for the filtered oil, said filter medium having deposited thereon as a filtration assistant a material consisting predominantly of a polyglycol selected from the group consisting of polyethylene glycol, polypropylene glycol, polyethylene-polypropylene glycol and mixtures thereof, said polyglycol having an average molecular weight of from about 180 to about 4000.

4. An oil filter of the type used in an engine for filtration of the engine lubricating oil comprising as oil penetrable filter medium in a container having an inlet for the admission of contaminated oil and an exit for the filtered oil, said filter medium having deposited thereon an effective amount of polypropylene glycol as a filtration assistant.

5. An oil filter as defined in claim 4 wherein said polypropylene glycol has an average molecular weight of from about 350 to 750.

6. An oil filter of the type used in an engine for filtration of the engine lubricating oil comprising an oil penetrable filter medium in a container having an inlet for the admission of contaminated oil and an exit for the filtered oil, said filter medium having deposited thereon an effective amount of polyethylene glycol as a filtration assistant.

7. An oil filter as defined in claim 6 wherein said polyethylene glycol has an average molecular weight of from about 1000 to about 4000.

8. An oil filter of the type used in an engine for filtration of the engine lubricating oil comprising an oil penetrable filter medium in a container having an inlet for the admission of contaminated oil and an exit for the filtered oil, said filter medium having deposited thereon an effective amount of polyethylene-polypropylene glycol as a filtration assistant.

9. An oil filter of the type used in an engine for filtration of the engine lubricating oil comprising an oil penetrable filter medium in a container having an inlet for the admission of contaminated oil and an exit for the filtered oil, said filter medium having deposited thereon as a filtration assistant a material selected from the group consisting of polyethylene glycol, polypropylene glycol, polyethylene-polypropylene glycol and mixtures thereof, the weight of said material being from about 5% to 30% of the weight of the filter medium.

10. An oil filter of the type used in an engine for filtration of the engine lubricating oil comprising an oil penetrable filter medium in a container having an inlet for the admission of contaminated oil and an exit for the filtered oil, said filter medium being impregnated with an oil insoluble thermosetting resin and having deposited thereon as a filtration assistant an effective amount of a material selected from the group consisting of polyethylene glycol, polypropylene glycol, polyethylene-polypropylene glycol and mixtures thereof.

11. An oil filter of the type used in an engine for filtration of the engine lubricating oil comprising an oil penetrable filter medium in a container having an inlet for the admission of contaminated oil and an exit for the filtered oil, said filter medium being impregnated with phenol formaldehyde resin and having deposited thereon as a filtration assistant an effective amount of polypropylene glycol, said polypropylene glycol having an average molecular weight of from about 350 to 750.

12. A method for purifying lubricating oils by filtration which comprises passing the oil to be filtered through a filter medium having deposited thereon a polyglycol selected from the group consisting of polyethylene glycol, polypropylene glycol, polyethylene-polypropylene glycol and mixtures thereof.

13. A method for purifying lubricating oils by filtration which comprises passing the oil to be filtered through a filter medium having deposited thereon a polyglycol having an average molecular weight of from about 180 to about 4000 and selected from the group consisting of polyethylene glycol, polypropylene glycol, polyethylene-polypropylene glycol and mixtures thereof.

14. A method for purifying lubricating oils by filtration which comprises passing the oil to be filtered through a filter medium having polypropylene glycol deposited thereon.

15. A method for purifying lubricating oils by filtration which comprises passing the oil to be filtered through a filter medium having deposited thereon polypropylene glycol with an average molecular weight of from about 350 to about 750.

References Cited in the file of this patent

UNITED STATES PATENTS

| | | |
|---|---|---|
| 2,321,884 | Allam | May 29, 1940 |
| 2,343,428 | Wells | Nov. 7, 1944 |
| 2,347,031 | Cupery | Apr. 18, 1944 |
| 2,613,813 | Rodman | Oct. 14, 1952 |
| 2,629,674 | Ericks | Feb. 24, 1953 |

FOREIGN PATENTS

| | | |
|---|---|---|
| 665,994 | Great Britain | Feb. 6, 1952 |
| 687,945 | Great Britain | Feb. 25, 1953 |

UNITED STATES PATENT OFFICE
CERTIFICATE OF CORRECTION

Patent No. 2,943,737                                July 5, 1960

James A. Norton

It is hereby certified that error appears in the printed specification of the above numbered patent requiring correction and that the said Letters Patent should read as corrected below.

Column 1, line 34, for "mproved" read -- improved --; column 3, line 46, for "mixture" read -- mixtures --; line 62, for "as oil" read -- an oil --; column 4, line 67, list of references cited, for "May 29, 1940" read -- June 15, 1943 --; line 68, for "Nov. 7, 1944" read -- Mar. 7, 1944 --.

Signed and sealed this 3rd day of January 1961.

(SEAL)
Attest:

KARL H. AXLINE
Attesting Officer

ROBERT C. WATSON
Commissioner of Patents